(12) United States Patent
Daneri et al.

(10) Patent No.: US 8,480,394 B2
(45) Date of Patent: Jul. 9, 2013

(54) FLAT-FLAME VAULT BURNER WITH LOW POLLUTING EMISSIONS

(75) Inventors: Marco Daneri, Genoa (IT); Vittorio Laviosa, Mele-Genoa (IT); Maurizio Senarega, Genoa (IT); Massimiliano Fantuzzi, Genoa (IT); Umberto Zanusso, Genoa (IT); Enrico Malfa, Zanica-Bergamo (IT)

(73) Assignee: Tenova S.p.A., Milan (IT)

( * ) Notice: Subject to any disclaimer, the term of this patent is extended or adjusted under 35 U.S.C. 154(b) by 1265 days.

(21) Appl. No.: 12/161,803

(22) PCT Filed: Jan. 25, 2007

(86) PCT No.: PCT/IB2007/000229
§ 371 (c)(1),
(2), (4) Date: Jul. 23, 2008

(87) PCT Pub. No.: WO2007/088458
PCT Pub. Date: Aug. 9, 2007

(65) Prior Publication Data
US 2010/0227284 A1 Sep. 9, 2010

(30) Foreign Application Priority Data
Jan. 31, 2006 (IT) .................... MI06A0155

(51) Int. Cl.
*F23D 14/12* (2006.01)
*F23D 14/24* (2006.01)
*F23D 14/22* (2006.01)
*F23D 14/66* (2006.01)

(52) U.S. Cl.
USPC ........... 431/284; 431/280; 431/281; 431/278; 431/8; 431/10; 431/159; 431/348

(58) Field of Classification Search
USPC .............. 431/8, 10, 278, 159, 284, 285, 348
See application file for complete search history.

(56) References Cited

U.S. PATENT DOCUMENTS

| | | | | |
|---|---|---|---|---|
| 2,822,864 | A | * | 2/1958 | Black ............................. 431/175 |
| 3,147,795 | A | * | 9/1964 | Livingston et al. ............ 431/174 |
| 3,159,387 | A | * | 12/1964 | Campbell, Jr. et al. ............ 432/9 |
| 3,233,650 | A | * | 2/1966 | Cleall ............................... 431/1 |
| 3,418,062 | A | * | 12/1968 | Hovis et al. .................... 431/350 |
| 3,424,542 | A | * | 1/1969 | Moore et al. ................... 431/348 |
| 3,481,680 | A | * | 12/1969 | Kohn ............................. 431/182 |
| 3,671,172 | A | * | 6/1972 | Chedaille et al. ............. 431/174 |

(Continued)

FOREIGN PATENT DOCUMENTS

| | | |
|---|---|---|
| DE | 40 01 378 | 7/1991 |
| DE | 4001378 A1 * | 7/1991 |

(Continued)

*Primary Examiner* — Carl Price
(74) *Attorney, Agent, or Firm* — Oblon, Spivak, McClelland, Maier & Neustadt, L.L.P.

(57) ABSTRACT

The invention relates to a flat-flame vault burner (10) suitable for being installed in a vault (21) which delimits the combustion chamber (20) of a steel heating furnace, the burner (10) comprising a main metallic hollow cylindrical body (12), a single duct (13) for the conveyance of fuel gas concentric to the main body (12), and a central internal nozzle (14) for the injection of a fuel gas. Said burner also comprises at least two nozzles (17) outside said main body (12) for the injection of fuel into the combustion chamber (20).

15 Claims, 5 Drawing Sheets

U.S. PATENT DOCUMENTS

| Patent Number | Kind | | Date | Inventor | Class |
|---|---|---|---|---|---|
| 3,741,751 | A | * | 6/1973 | Bone | 5/680 |
| 3,749,548 | A | * | 7/1973 | Zink et al. | 431/158 |
| 3,758,263 | A | * | 9/1973 | Kissel | 431/158 |
| 3,836,315 | A | * | 9/1974 | Shular | 431/9 |
| 4,004,789 | A | * | 1/1977 | Belas et al. | 266/87 |
| 4,039,844 | A | * | 8/1977 | MacDonald | 250/554 |
| 4,094,625 | A | * | 6/1978 | Wang et al. | 431/9 |
| 4,095,929 | A | * | 6/1978 | McCartney | 431/19 |
| 4,203,717 | A | * | 5/1980 | Facco et al. | 431/182 |
| 4,220,444 | A | * | 9/1980 | Reed et al. | 431/348 |
| 4,313,789 | A | * | 2/1982 | Frahme | 162/152 |
| 4,347,052 | A | * | 8/1982 | Reed et al. | 431/188 |
| 4,396,223 | A | * | 8/1983 | Drexel et al. | 296/201 |
| 4,451,230 | A | * | 5/1984 | Bocci et al. | 431/284 |
| 4,505,666 | A | * | 3/1985 | Martin et al. | 431/175 |
| 4,945,841 | A | * | 8/1990 | Nakamachi et al. | 110/341 |
| 5,154,598 | A | * | 10/1992 | Gooderham et al. | 431/188 |
| 5,154,599 | A | * | 10/1992 | Wunning | 431/215 |
| 5,195,884 | A | * | 3/1993 | Schwartz et al. | 431/8 |
| 5,403,181 | A | * | 4/1995 | Tanaka et al. | 431/8 |
| 5,441,403 | A | * | 8/1995 | Tanaka et al. | 431/175 |
| 5,570,679 | A | * | 11/1996 | Wunning | 126/91 A |
| 5,658,141 | A | * | 8/1997 | Larquet et al. | 431/187 |
| 5,961,312 | A | * | 10/1999 | Sugiyama et al. | 431/8 |
| 6,007,325 | A | * | 12/1999 | Loftus et al. | 431/8 |
| 6,347,935 | B1 | * | 2/2002 | Schindler et al. | 431/5 |
| 6,416,317 | B1 | * | 7/2002 | Arnoux et al. | 431/79 |
| 6,422,858 | B1 | * | 7/2002 | Chung et al. | 431/8 |
| 6,638,061 | B1 | * | 10/2003 | Cain et al. | 432/14 |
| 6,764,304 | B2 | * | 7/2004 | Atreya | 432/5 |
| 6,773,256 | B2 | * | 8/2004 | Joshi et al. | 431/9 |
| 6,796,790 | B2 | * | 9/2004 | Venizelos et al. | 431/8 |
| 6,824,383 | B2 | * | 11/2004 | Cain | 431/12 |
| 7,402,038 | B2 | * | 7/2008 | Neville et al. | 431/12 |
| 2002/0055078 | A1 | * | 5/2002 | Giraud et al. | 431/349 |
| 2002/0090583 | A1 | * | 7/2002 | Cain | 431/2 |
| 2004/0154307 | A1 | * | 8/2004 | Carrea | 60/776 |
| 2005/0277074 | A1 | * | 12/2005 | Zinn et al. | 431/9 |
| 2006/0000395 | A1 | * | 1/2006 | Joshi et al. | 110/267 |
| 2006/0029894 | A1 | * | 2/2006 | Zinn et al. | 431/9 |
| 2007/0254251 | A1 | * | 11/2007 | Cao et al. | 431/10 |
| 2007/0269755 | A2 | * | 11/2007 | Gibson et al. | 431/9 |

FOREIGN PATENT DOCUMENTS

| | | | |
|---|---|---|---|
| EP | 0 041 645 | | 12/1981 |
| EP | 137362 A2 | * | 4/1985 |
| EP | 0430376 | * | 5/1991 |
| EP | 0 592 081 | | 4/1994 |
| EP | 0 787 947 | | 8/1997 |
| EP | 1 031 790 | | 8/2000 |
| JP | 52029634 A | * | 3/1977 |
| JP | 52032132 A | * | 3/1977 |
| JP | 57084905 A | * | 5/1982 |
| JP | 02106607 A | * | 4/1990 |
| WO | 02 21044 | | 3/2002 |

* cited by examiner

FLAT-FLAME VAULT BURNER WITH LOW POLLUTING EMISSIONS

The present invention relates to a flat-flame vault burner with low polluting emissions.

In particular, the object of the invention is a radiant burner fed with gas having low polluting emissions of nitrogen oxides.

The above type of burner is characterized in that it is installed on the vault of heating or thermal treatment furnaces, in particular in areas where a high temperature uniformity generated by radiancy is required.

These burners are also known as "flat-flame burners" or "radiant vault burners" and are installed in a regular formation on the furnace vault. In order to increase the efficiency of the combustion chambers operating at a high temperature and reduce the consumption of fuel, the preheating temperature of the comburent is normally increased as much as possible, with the consequent drawback of having high NOx emissions, whose production is known to be in relation to the maximum flame temperature.

In this respect, European patent Nr. 0041645 forms part of the known art, exclusively relating to a flat-flame burner, not characterized however by having low polluting emissions of nitrogen oxides.

Regulations on atmospheric pollution control, which have been undergoing modifications in the last few years, envisage constantly decreasing limits to the emission of nitrogen oxides, NOx.

It is therefore necessary to reduce the production of nitrogen oxides by intervening on the combustion process of vault burners, in order to satisfy market requests which from the current 100 ppm can drop to even 20-30 ppm, also in the presence of air preheated to 500° C.

Diluted combustion and flameless combustion are techniques commonly used for abating nitrogen oxides in lateral and front burners (which can be installed on the walls of the combustion chamber and which have an axial development of the reagent jet).

The Applicant has therefore felt the necessity of applying these techniques to radiant burners, an application which has so far been limited by the impossibility of keeping the flame flat, and returning to a globular flame rather than a longitudinal flame.

A general objective of the present invention is therefore to provide a flat-flame burner with low emissions of nitrogen oxides according to the flameless combustion principles obtained by means of gas staging.

A further objective of the present invention is to be able to bring the furnace to an operating temperature stably above the autoignition temperature of the fuel, which for natural gas is about 850° C. It is in fact known that to be able to operate flameless combustion in regime under safety conditions, it is necessary to be constantly and stably above said limit temperature.

Another objective of the present invention is to improve the thermal uniformity in the combustion chamber in the direction perpendicular to the vault thanks to the application of flameless combustion which distributes the combustion reaction within the whole volume of the chamber.

Yet another objective of the present invention is to provide a radiant gas burner, capable of maintaining low emissions in a wide functioning regime, and which is also capable of easily modifying the thermal profile inside the combustion chamber.

In view of the above objectives, according to the present invention, a flat-flame vault burner with low polluting emissions comprises a main metallic hollow cylindrical body mounted to a vault which delimits the combustion chamber of a steel heating furnace, a single duct for the conveyance of fuel gas concentric to the main body, a central internal nozzle for the injection of a fuel gas, at least two nozzles outside said main body for the injection of fuel into the combustion chamber, a first dividing valve or orifice, suitable for regulating the central fuel gas flow-rate, a gas distribution system consisting of a series of pipes, destined for feeding said at least two outer nozzles, and a second dividing valve suitable for regulating the gas flow-rate of said at least two outer nozzles.

The structural and functional characteristics of the present invention and its advantages with respect to the known art will appear even more evident from the following description, referring to the enclosed drawings which illustrate a flat-flame vault burner with low polluting emissions produced according to the innovative principles of the invention itself.

Figure 1:
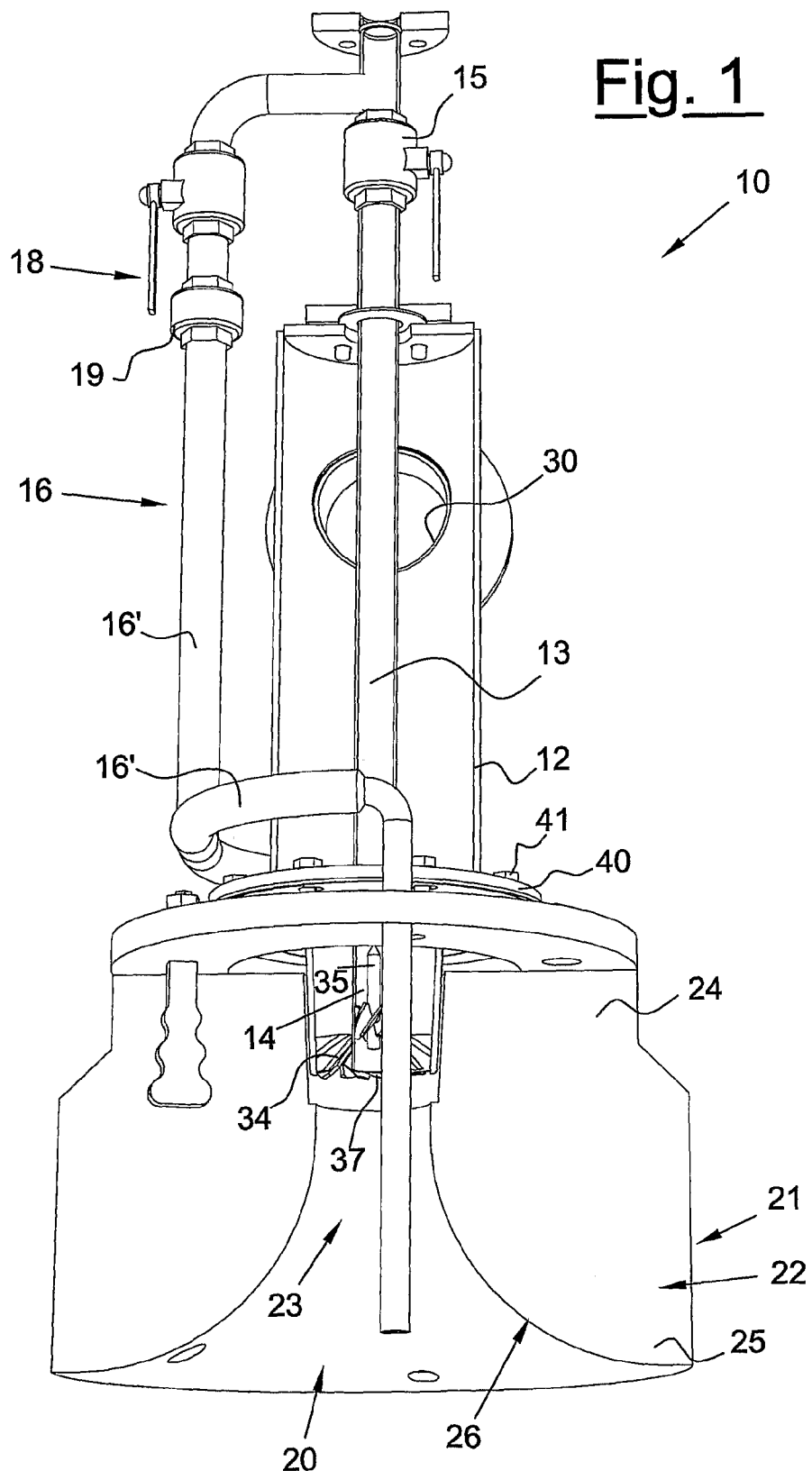
FIGS. 1 and 2 are partially raised sectional perspective views of the burner according to the invention installed in an furnace vault.
Figure 2:
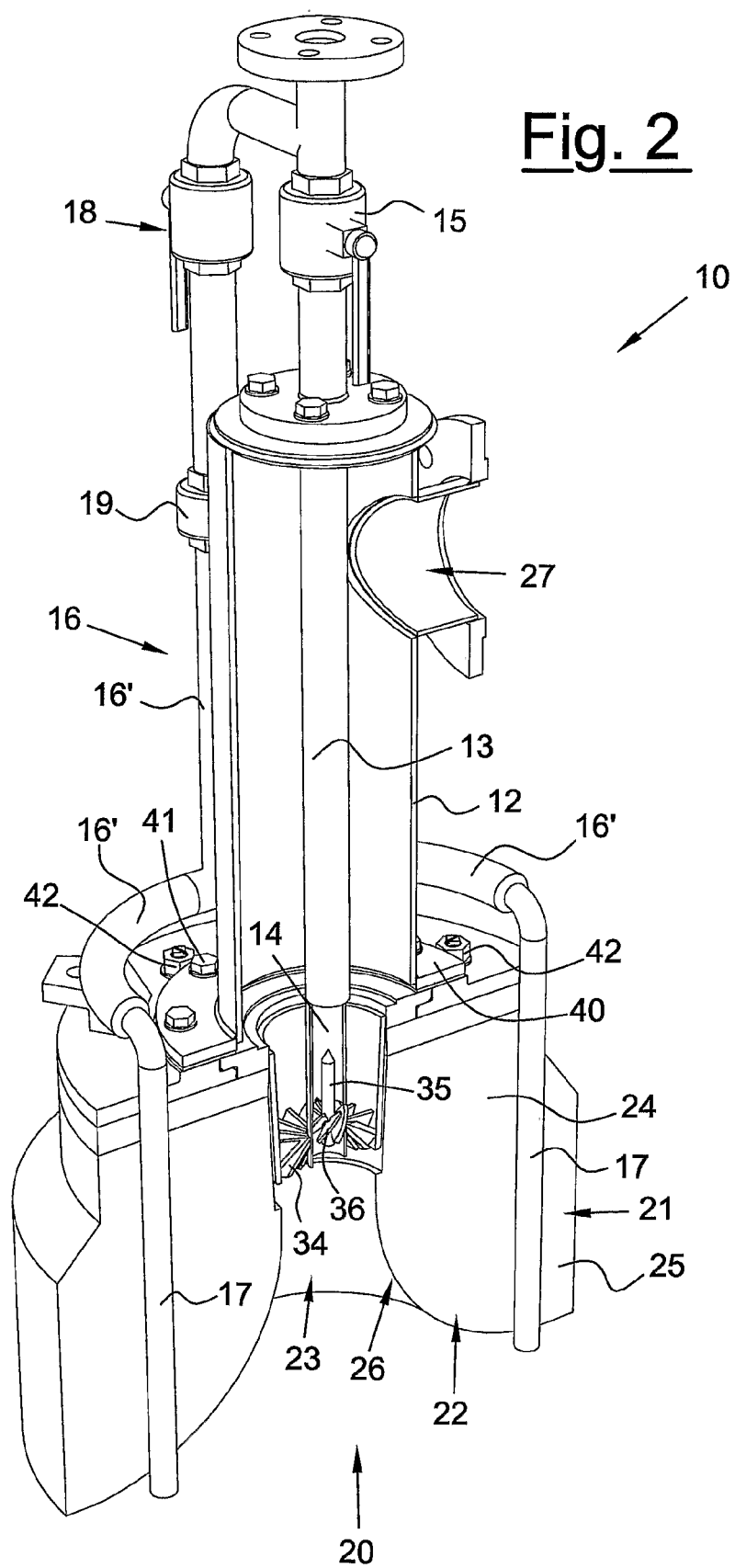
Figure 3:
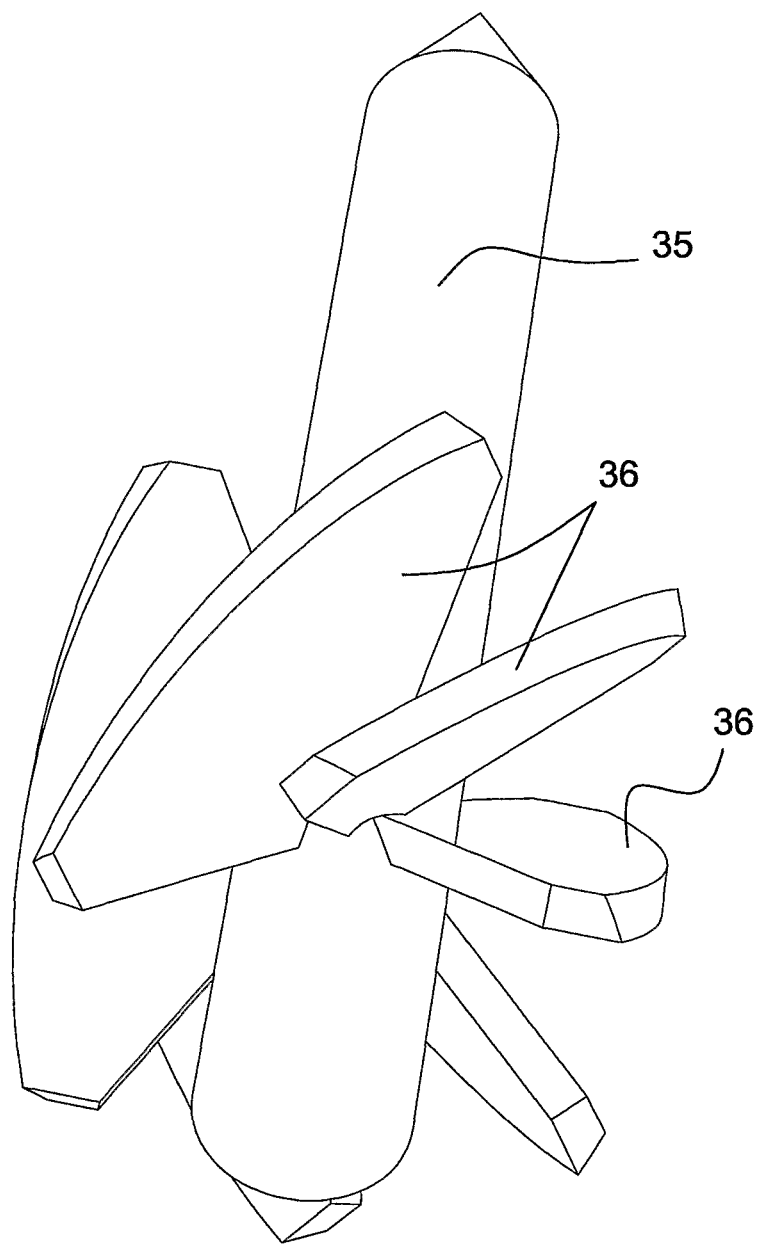
FIGS. 3 and 4 illustrate a perspective view of two details of the burner according to the invention.
Figure 4:
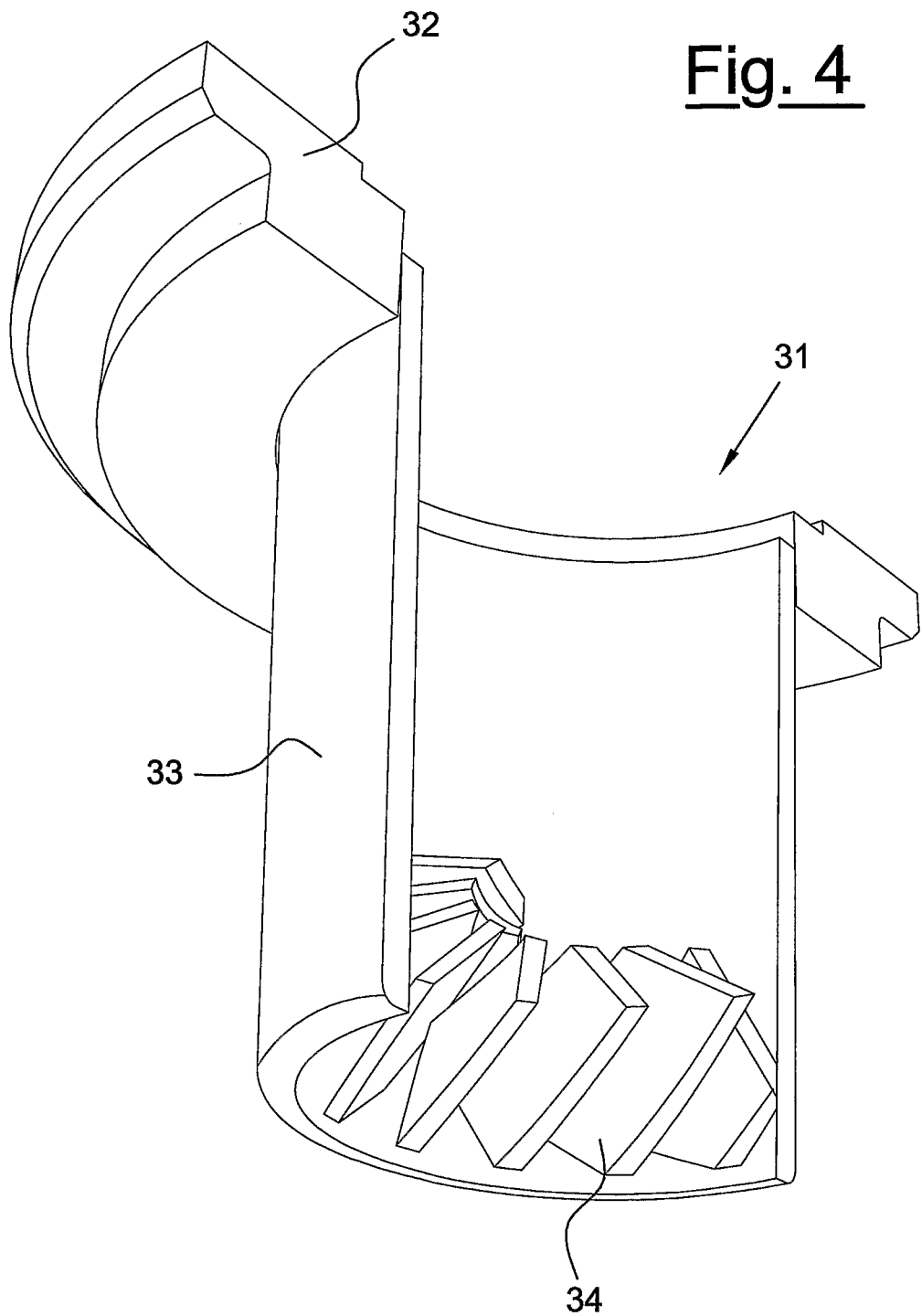
Figure 5:
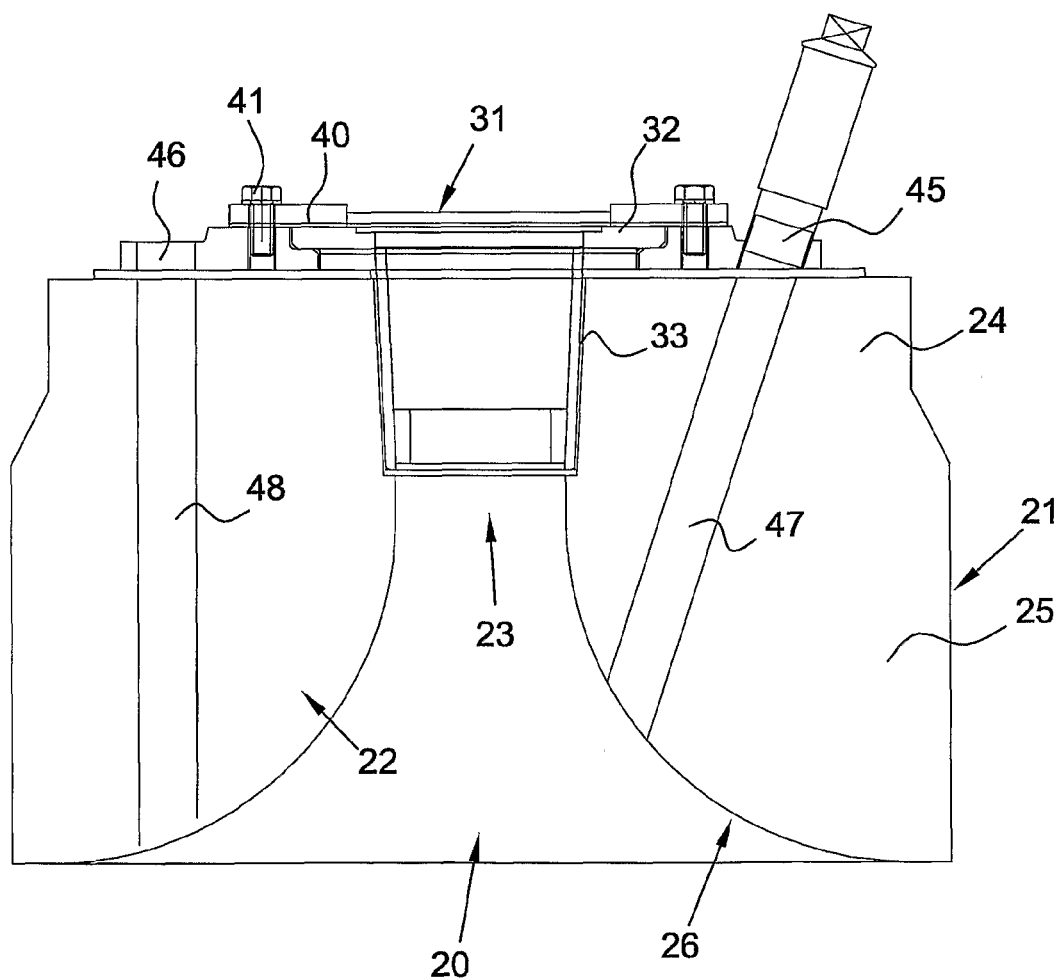
FIG. 5 is a raised schematic view of the burner installed.

With reference to the drawings, a radiant gas burner with low polluting emissions, object of the invention, is indicated as whole with 10, and in the example illustrated, according to the present invention it is installed in a vault 21 which delimits the combustion chamber 20 of a steel heating furnace.

The burner 10 comprises:
a main metallic hollow cylindrical body 12,
a single duct 13 for conveying fuel gas concentric to the main body 12,
an internal central nozzle 14 for the injection of a fuel gas,
a first partializing (dividing) device 15 represented as a partializing (dividing) valve, as a non-limiting example, suitable for regulating the central fuel gas flow-rate,
a gas distribution system 16 consisting of a series of pipes 16',
at least two nozzles 17 outside said main body 12 for the injection of the fuel into the combustion chamber 20 fed by said pipes 16',
a second partializing device 18 indicated as a second partializing valve, as a non-limiting example, suitable for regulating the gas flow-rate at the above at least two outer nozzles 17,
a connection 19 suitable for joining portions of said pipes 16' to facilitate the dismantling of the above partializing valve 18,
a ceramic block 22 made of a refractory material which forms the vault 21 in which there is a furnace-mouth 23.

Said furnace-mouth 23 comprises a substantially cylindrical rear area 24 and a connecting countersunk front area 25, preferably delimited by a wall 26 with a profile having a circular or ellipsoidal sector extending for example for an angle of 90°.

A single air conveyance duct 30 preferably preheated is connected to the main metallic body 12.

The burner 10 also comprises an air diffuser 31 preferably made of a metallic material, comprising an anchoring plate 32, a tubular body 33 and a series of blades 34 in a number ranging from four to twenty-six, and preferably sixteen, dextrorotatory or laevorotatory oriented with a slope ranging from 0 to 35°.

Inside the gas nozzle 14, there is a gas turbulator 35 represented by a fixed helix consisting of blades, preferably metallic 36, in a number ranging from three to ten, preferably six, dextrorotatory or laevorotatory oriented with a slope ranging from 0 to 60° and the outlet hole 37 into the combustion chamber of said gas nozzle 14, from which the fuel is discharged with a rate ranging from 10 to 50 m/s.

The metallic body 12 is connected to the refractory block 21 by means of a flange 40 and bolts 41, as well as a plate 42 and studs 18, or in another suitable way.

The burner 10 according to the invention is capable of functioning both as a pilot in the flame mode (i.e. it can bring a furnace to the correct temperature) or in a flameless mode with low nitrogen oxide emissions.

Said burner 10 also comprises a housing 45 for an ignition device of the burner 10 and also a housing 46 for a flame detector.

Said housings 45 and 46 communicate with housings situated in the ceramic block 21, indicated with 47 and 48, respectively.

Said housings 45 and 46 provide the mechanical support for the correct positioning of the ignition device and flame detector of the burner 10, respectively.

When it is necessary to use the burner in the "pilot" mode, i.e. when the temperature of the combustion chamber 20 of the furnace has not reached the autoignition temperature of the fuel, the burner operates with gas leaving the central nozzle 14.

When the combustion chamber 20 of the furnace has reached the autoignition temperature of the fuel gas in air (i.e. for natural gas, about 850° C.), it is possible to pass to a flameless mode: by operating with the partializing valves 15 and/or 18, the fuel gas is injected through said at least two outer side gas nozzles 17 at a rate ranging from 20 to 200 m/s.

The preheated air entering from the duct 30 flows through the body 12 towards the air diffuser 31 where it reaches rates ranging from 50 to 150 m/s in relation to the feeding pressure and preheating temperature of the air itself.

According to the present invention, in fact, once the thermal power supplied by the burner 10 has been established, it is possible to continuously pass from one mode to the other by simply varying the distribution percentage of the fuel fluid between the central internal nozzle 14 and said at least two outer nozzles 17, by simply acting on the distribution system—valves 15 and 18—of the fuel without at all modifying the comburent air supply.

When the burner is functioning, the comburent air, preferably preheated, is introduced into the combustion chamber 20 through the air diffuser 31.

The functioning of the two flame and flameless modes is described hereunder:

in the flame mode—compatible with any temperature of the combustion chamber—the fuel is directed, by suitably operating on the distribution valves 15 and/or 18, through the central gas nozzle 14 only.

An excellent mixing area is created in the furnace-mouth 23 between air and fuel, which allows the formation of a defined and stable flame front;

in the flameless mode—compatible with temperatures in the combustion chamber higher than the autoignition temperature of the fuel—the fuel is diverted, by suitably operating on the distribution valves 15 and/or 18, through the outer gas nozzles 17 only.

The gas jets perforate the layer of air adherent to the curved surface of the furnace-mouth 23 and cause the combustion reaction in an area with a homogeneous atmosphere in which there is optimum mixing between the fuel gas, preheated air and combusted gases; the combustion reaction takes place in a diluted form and there is no formation of a flame front.

In the mixing areas of the gas with the comburent and with the combustion products, already upstream of the reaction, there is a reduced oxygen content, lower than atmospheric level. The limitation of the oxygen concentration allows the reaction to be developed in a greater volume. This causes the reaction between the more diluted reagents, which consequently develops more slowly. This limits the formation of temperature peaks, in correspondence with which the formation of nitrogen oxides (thermal NOx) is favoured.

In a flameless mode, the gas can be injected:

parallelly to the burner axis or it can be injected so that the fuel gas jets have tangential movement (from 0 to 15°) and radial movement (from 0 to 15°) components with respect to the axis of the burner, so that they move away from the burner axis itself or;

it can be injected so that the fuel gas jets have tangential movement (from 0 to 15°) and radial movement (from 0 to 15°) components with respect to the axis of the burner, so that they move towards the burner axis itself.

The percentage variation in the gas distributed by the valves 15 and 18, between the central nozzle 14 and said at least two outer nozzles 17, allows the continuous passage from a flame functioning mode to a flameless functioning mode.

It is also possible to produce the housing 45 of the ignition device coaxial with the burner axis, or with a convergent slope from 0° to 30° with respect to the axis of the burner.

Analogously, the housing 46 of the flame detector can be coaxial with the axis of the burner, or with a convergent slope from 0° to 30° with respect to the axis of the burner.

There are preferably two outer nozzles 17, arranged symmetrically with respect to the burner axis, as illustrated but there can also be four of them. According to the preferred embodiment, the nozzles are arranged vertically.

Instead of the partializing valve 15, it is possible to have a calibrated orifice interpositioned between flanges.

It is also advantageously possible to envisage the presence of a refractory insulation inside the metallic body 12.

The connection 19 does not have to be present when there are no particular assembly/dismantling requirements. The following dimensional characteristics of the burner according to the invention installed in the vault of a furnace are also defined:

p: distance of the terminal surface of any of said at least two outer nozzles 17 from the vault of the combustion chamber; positive distance when the outer nozzle 17 considered penetrates the combustion chamber; negative distance when the outer nozzle 17 considered remains inside the refractory block 10;

h: distance of the surface delimited by the circumference of the air diffuser 31 of the internal side of the combustion chamber from the vault 21 of the combustion chamber itself;

l: distance of the centre of the terminal surface of any of said at least two outer nozzles 17 from the axis of the burner;

dl: diameter of the housing hole of the refractory block 22 for the metallic air diffuser 31 in correspondence with the surface delimited by the circumference of the air diffuser 31 of the internal side of the combustion chamber 20;

H: thickness of the refractory block 22;

D: diameter of the maximum terminal circumference of the curved surface of the refractory block 22;

DB: outer diameter of the refractory block 22.

On the basis of the definitions indicated above, the following relations between parameters are established for the present invention (where the sign <= means less than or equal to):

$-0.1 <= (p/H) <= 0.1$, preferably $(p/H) = -0.06$;

$0 <= (h/H) <= 0.75$, preferably $(h/H) = 0.5$;

$0.1 <= D1/D <= 0.4$, preferably $0.17 <= D1/D <= 0.22$;

$0 <= (DB-D) <= 0.5$, preferably $(DB-D)=0.1$.

From what is described above with reference to the figures, it is evident how a gas burner according to the invention is particularly useful and advantageous. The objective mentioned in the preamble of the description is therefore achieved.

The forms of the gas burner of the invention, as also the materials, can obviously differ from that shown for purely illustrative and non-limiting purposes in the drawings.

The protection scope of the invention is therefore delimited by the enclosed claims.

The invention claimed is:

1. A flat-flame vault burner comprising:
 a main metallic hollow cylindrical body mounted to a refractory block having a countersunk mouth defining a curved surface which delimits a combustion chamber of a heating furnace,
 a duct for the conveyance of fuel gas concentric to the hollow cylindrical body,
 a central internal nozzle extending in the direction of the longitudinal axis of the hollow cylindrical body for the injection of a fuel gas from said duct into the combustion chamber, wherein the hollow cylindrical body is adapted to convey combustion air to the combustion chamber, to produce a flat flame and a layer of air adherent to the curved surface of the countersunk mouth,
 at least two nozzles in said block and having outlets emerging at the curved surface of the countersunk mouth for the injection of fuel into the combustion chamber,
 a gas distribution system connected to said at least two nozzles and comprising a series of pipes for feeding fuel gas to said at least two nozzles,
 a first flow regulator operatively associated with said duct for the conveyance of fuel gas, for regulating a central fuel gas flow-rate for providing flame combustion,
 a second flow regulator operatively associated with said series of pipes for regulating the gas flow-rate of said at least two outer nozzles such that a gas flow from said at least two nozzles is able to penetrate the layer of air adherent to the surface of the countersunk mouth, to selectively provide flameless operation of the burner.

2. The flat-flame vault burner according to claim 1, wherein said at least two nozzles are arranged symmetrically with respect to the axis of the hollow cylindrical body.

3. The flat-flame vault burner according to claim 1, wherein said at least two nozzles comprises four nozzles.

4. The flat-flame vault burner according to claim 1, wherein said at least two nozzles are oriented to inject the fuel into the combustion chamber in a vertical direction.

5. The flat-flame vault burner according to claim 1, wherein said at least two nozzles are oriented to inject gas in parallel to the axis of the hollow cylindrical body.

6. The flat-flame vault burner according to claim 1, wherein the vault comprises a ceramic block made of a refractory material having said furnace-mouth, said furnace-mouth comprising a substantially cylindrical rear area and a connecting countersunk front area delimited by a wall with a profile having a circular or ellipsoidal sector extending for an angle of 90°.

7. The flat-flame vault burner according to claim 6, wherein said at least two nozzles terminate at said wall with a profile having a circular or ellipsoidal sector.

8. The flat-flame vault burner according to claim 1, wherein said burner further comprises an air diffuser made of a metallic material, the air diffuser comprising
 an anchoring plate,
 a tubular body and
 a series of from four to twenty-six blades oriented with a slope ranging from 0 to 35°.

9. The flat-flame vault burner according to claim 8, wherein:
 where p is the distance of the terminal surface of any of said at least two nozzles from the vault of the combustion chamber, said distance being considered a positive value when the nozzle penetrates the combustion chamber, and a negative value when the outer nozzle remains inside the refractory block;
 where h is the distance of the surface delimited by the circumference of the air diffuser of the internal side of the combustion chamber from the vault of the combustion chamber itself;
 where l is the distance of the centre of the terminal surface of any of said at least two nozzles from the axis of the hollow cylindrical body;
 where dl is the diameter of the housing hole of the refractory block for the metallic air diffuser in correspondence with the surface delimited by the circumference of the air diffuser of the internal side of the combustion chamber;
 where H is the thickness of the refractory block;
 where D is the diameter of the maximum terminal circumference of the curved surface of the refractory block; and
 where DB is the outer diameter of the refractory block, the following relations between parameters are established:
 $-0.1 <= (p/H) <= 0.1$ (wherein the sign $<=$ means less than or equal to).

10. The flat-flame vault burner according to claim 9, wherein $0 <= (h/H) <= 0.75$.

11. The flat-flame vault burner according to claim 9, wherein $0.1 <= D1/D <= 0.4$.

12. The flat-flame vault burner according to claim 9, wherein $0 <= (DB-D) <= 0.5$.

13. A flat-flame vault burner comprising:
 a main metallic hollow cylindrical body mounted to a vault which delimits the combustion chamber of a steel heating furnace,
 a single duct for the conveyance of fuel gas concentric to the main body,
 a central internal nozzle extending in the direction of the cylinder axis of the hollow cylindrical body for the injection of a fuel gas into the combustion chamber to produce a flat flame
 at least two nozzles outside said main body for the injection of fuel into the combustion chamber,
 a first flow regulator suitable for regulating the central fuel gas flow-rate,
 a gas distribution system consisting of a series of pipes for feeding said at least two outer nozzles, and
 a second flow regulator suitable for regulating the gas flow-rate of said at least two outer nozzles,
 further comprising a gas turbulator inside the central gas nozzle, the gas turbulator comprising a fixed helix consisting of metallic blades in a number ranging from three to ten, dextrorotatory or laevorotatory oriented with a slope ranging from 0 to 60°, and an outlet hole exiting into the combustion chamber at said central gas nozzle.

14. A flat-flame vault burner comprising:
 a main metallic hollow cylindrical body mounted to a vault which delimits the combustion chamber of a steel heating furnace,
 a single duct for the conveyance of fuel gas concentric to the main body, a central internal nozzle extending in the direction of the cylinder axis of the hollow cylindrical body for the injection of a fuel gas into the combustion chamber to produce a flat flame, at least two nozzles outside said main body for the injection of fuel into the combustion chamber, a first flow regulator suitable for regulating the central fuel gas flow-rate, a gas distribution system consisting of a series of pipes for feeding said at least two outer nozzles, and a second flow regulator suitable for regulating the gas flow-rate of said at least two outer nozzles, wherein the vault comprises a ceramic block made of a refractory material having said furnace-mouth, said furnace-mouth comprising a substantially cylindrical rear area and a connecting countersunk front area delimited by a wall with a profile having a circular or ellipsoidal sector extending for an angle of 90°, wherein said burner also comprises a housing for an ignition device of the burner as well as a housing for a flame detector, said housings being arranged so as to communicate with respective housings situated in the ceramic block, said housings for the ignition device and flame detector providing mechanical support for a correct positioning of the ignition device and flame detector, respectively.

15. The flat-flame vault burner according to claim 14, wherein the housing of the ignition device forms a slope of from 0° to 30° with respect to the cylinder axis of the hollow cylindrical body, and the housing of the flame detector forms a slope of from 0° to 30° with respect to the cylinder axis of the hollow cylindrical body.

* * * * *